United States Patent [19]

Dimmick et al.

[11] Patent Number: 5,193,050
[45] Date of Patent: Mar. 9, 1993

[54] ENCLOSURE FOR ELECTRONIC SUBSYSTEMS IN A DATA PROCESSING SYSTEM

[75] Inventors: Roger F. Dimmick, Rochester; Vernon J. Kleve, Pine Island; Timothy L. Meyer, Mazeppa; Gary A. Thompson, Pine Island; Gordon W. Westphal, Rochester, all of Minn.

[73] Assignee: International Business Machines Corporation, Armonk, N.Y.

[21] Appl. No.: 794,314

[22] Filed: Nov. 14, 1991

[51] Int. Cl.⁵ .............................................. H05K 7/20
[52] U.S. Cl. .................................... 361/384; 361/393; 361/394; 361/413; 361/390; 364/708
[58] Field of Search ............... 361/380, 381, 383, 384, 361/390, 391, 392, 393, 394, 399, 413, 415; 364/708

[56] References Cited

U.S. PATENT DOCUMENTS

| | | | |
|---|---|---|---|
| 4,084,250 | 4/1978 | Albertine et al. | 364/708 |
| 4,648,007 | 3/1987 | Garner | 361/384 |
| 4,922,125 | 5/1990 | Casanova et al. | 307/149 |
| 5,006,959 | 4/1991 | Freige et al. | 361/384 |

FOREIGN PATENT DOCUMENTS

| | | |
|---|---|---|
| 0269479 | 1/1988 | European Pat. Off. |
| 0300717 | 1/1989 | European Pat. Off. |
| 0320107 | 6/1989 | European Pat. Off. |
| 0328260 | 8/1989 | European Pat. Off. |

Primary Examiner—Leo P. Picard
Assistant Examiner—Young S. Whang
Attorney, Agent, or Firm—Roy W. Truelson; J. Michael Anglin

[57] ABSTRACT

An enclosure for different subsystem variations of a data processing system has a box with front and rear regions separated by an interconnection carrier. The front is divided into standard-size bays for functional modules, while support modules slide into rear bays. A vertical central carrier contains electrical interconnections between the functional and support modules. An environmental module provides cooling air through the enclosure.

21 Claims, 6 Drawing Sheets

ENCLOSURE FOR ELECTRONIC SUBSYSTEMS IN A DATA PROCESSING SYSTEM

BACKGROUND

The present invention relates to electronics packaging, and more specifically relates to an enclosure for holding and interconnecting individual modules so as to form an integrated subsystem of a data processing system.

Midrange and mainframe data processing systems are often physically packaged in one or more vertical racks. Each rack commonly has a standard width and a defined unit height for mounting enclosures having the standard width and an integer multiple of the unit height. Each enclosure may contain a subsystem of the entire system: a central electronics complex (CEC), mass storage facilities, communications equipment, and so forth.

Mass storage typifies one class of subsystems. Such a subsystem has multiple functional modules—such as multiple small fixed-disk drives or backup tape drives, or a combination of the two—which couple to the remainder of the system essentially as a single unit, such as by a common data bus. The system may not even be aware of what individual functional modules comprise the subsystem.

Such a subsystem should also include all support modules required by the functional modules, so that the subsystem can be inserted into and removed from the system as an integral unit without requiring any changes to the remainder of the system. For example, the subsystem itself should provide the power in a form and amount adequate to supply all the functional modules, requiring only raw power from the rack. Backup or uninterruptible power may also be necessary. The subsystem itself may be required to collect data from the functional modules into a single bus, or to convert it to another electrical level or even to an entirely different bus or protocol.

A subsystem of this type also commonly comprises functional modules requiring relatively large amounts of power. Therefore, the subsystem itself should provide adequate cooling for all of the modules located in it.

Packaging for such subsystems is usually designed on an ad-hoc basis for each different subsystem, even within the same overall system. This proliferates part numbers and tooling for the system, increasing the expense and complexity of manufacturing the system.

Moreover, different customers of the same system—or the same customers at different times—require subsystems of the same type which are customized to their particular needs. For example, one customer may need a mass-storage subsystem having a maximum data capacity, regardless of any other consideration. Another may need less capacity, but must have at least one removable-medium device for transfer to another system for backup. One customer may not require any uninterruptible power, but another may need enough emergency power to complete an orderly shutdown, and yet another may wish to remain fully operational through longer periods of primary power loss. Interfaces to the system may differ for different customers. One may wish to interconnect the subsystem to a CEC in the same rack, requiring only repowering or level conversion of the data signals. Another may wish to integrate an I/O processor or controller into the subsystem itself, then communicate to the CEC via another protocol or bus. A third may desire to convert the output of a controller to another form suitable for transmission to the remainder of the system over longer distances.

SUMMARY OF THE INVENTION

The present invention provides a single enclosure design which may be easily configured to hold different types, and different variations of the same type, of subsystem for a rack-mounted data processing system. The design is inexpensive and simple to manufacture. It provides functional, support, and environmental modules which can be removably inserted into the enclosure in an easy manner, even in the field.

Briefly, the enclosure design comprises a box having front and rear regions separated by an interconnection carrier. The front is divided into standard-size bays for functional modules, while support modules slide into the rear. A central carrier contains the electrical interconnections between the functional and support modules; frequently, only this piece needs to be unique to a given design, and even then perhaps only the internal wiring needs to be changed. An environmental module provides cooling air through the enclosure.

DRAWINGS

DESCRIPTION OF A PREFERRED EMBODIMENT

Figure 1:
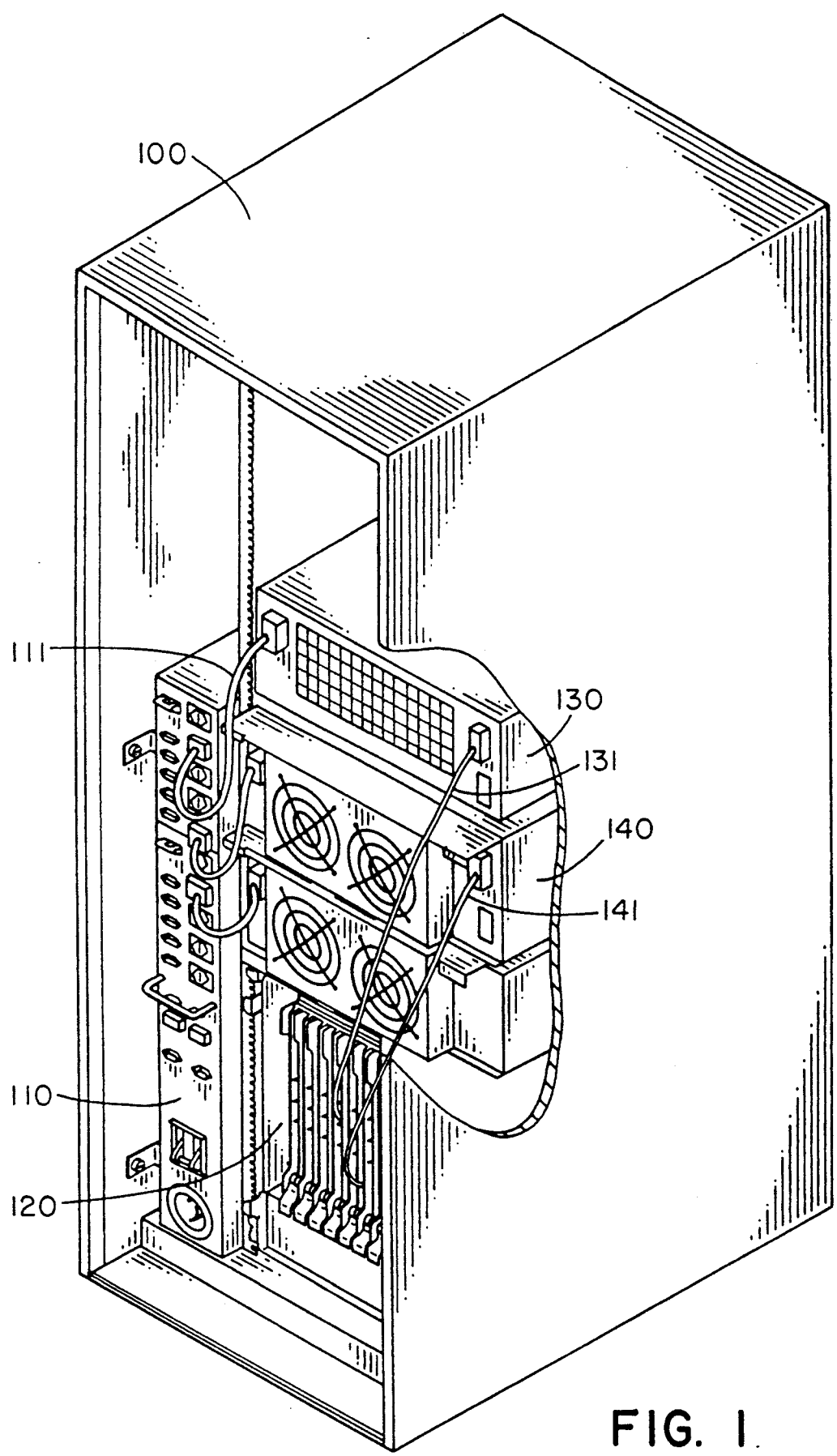
FIG. 1 shows a rack-mounted data processing system in which the invention finds utility.

FIG. 1 shows a mid-range data processing system 100 which incorporates the invention. A standard 19-inch rack holds a number of individual subsystems which are cabled together for data interchange and power. A vertical enclosure 110 distributes AC power via cabling 111 to all subsystems in the rack. A conventional central electronics complex (CEC) 120 holds logic books for processors, memory, input/output adapters, and other purposes (not shown). A typical CEC enclosure is shown in copending commonly assigned applications Ser. No. 467,594, filed Jan. 19, 1990 by Casanova et al, Ser. No. 467,595, filed Jan. 19, 1990 by Casanova et al., and Ser. No. 467,450, filed Jan. 19, 1990 by Aug et al. Other enclosures in the rack may hold mass storage devices. These receive AC power from enclosure 110, and communicate with CEC books via data cables. Enclosure 130, for example, holds a single large direct-access storage device (DASD) which receives power from cabling 111 and exchanges data with the CEC via cable 131.

Figure 2:
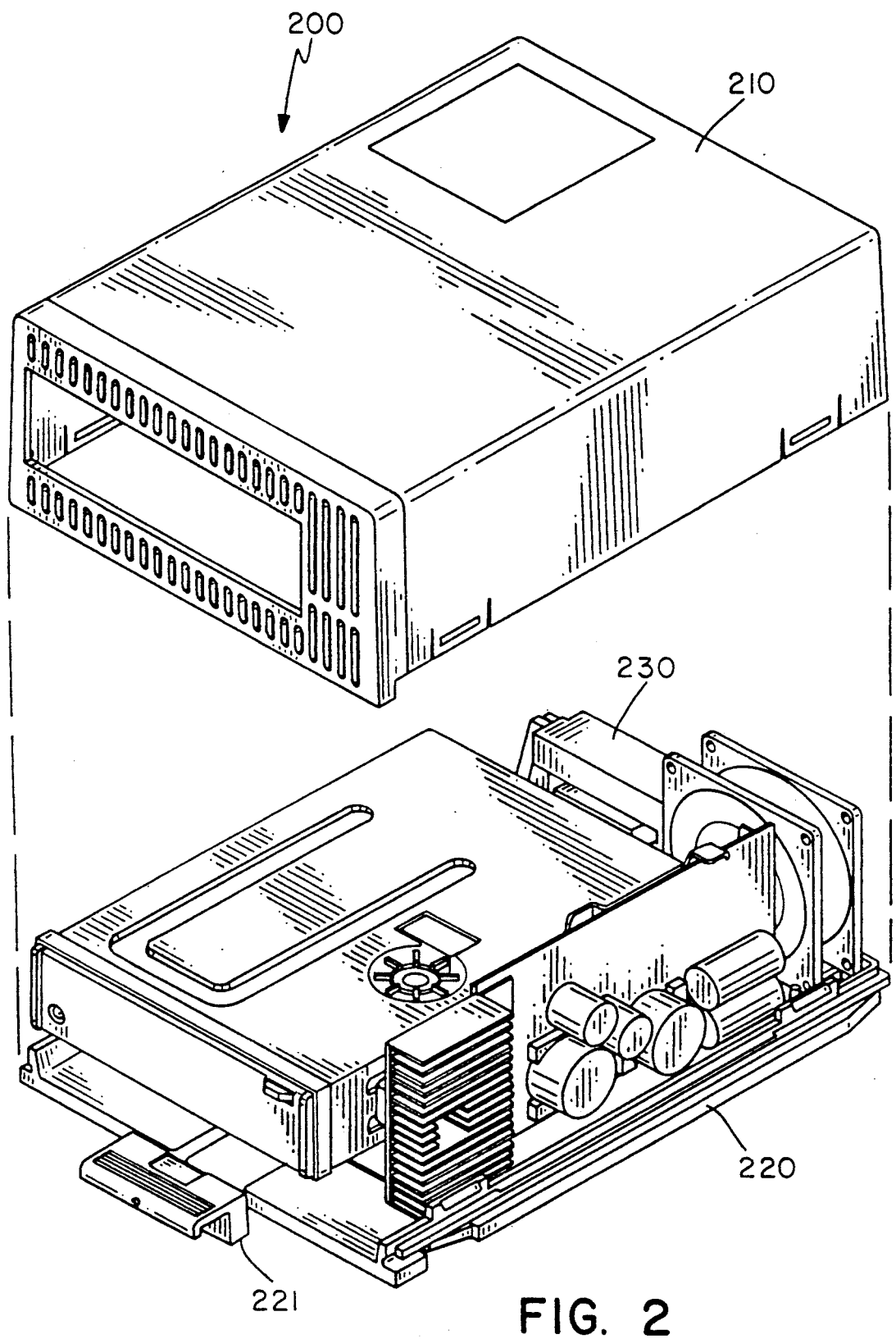
FIG. 2 shows a conventional data unit which may be housed in an enclosure according to the invention.

Enclosure 140 holds a mass storage subsystem for the data processing system. This subsystem includes multiple disk and/or tape drive modules having a standard 5.25-inch size, along with all support functions necessary to integrate the subsystem as a unit into the data processing system. FIG. 2 shows an example of a conventional tape drive 200 mounted in a casing 210 on a tray 220 for docking in a bay. The form factor of the entire module is 8 inches wide by 10 inches long by 4 inches high. Tray 220 has a locking tab 221 for holding it in a suitable position, and has a connector group 230. U.S. Pat. No. 4,853,830, issued Aug. 1, 1989 to Corfits, et al. shows a suitable drive of this type. Cabling 111 supplies AC power to enclosure 140, and data cable 141 couples data from the enclosure to CEC 120.

Figure 3:
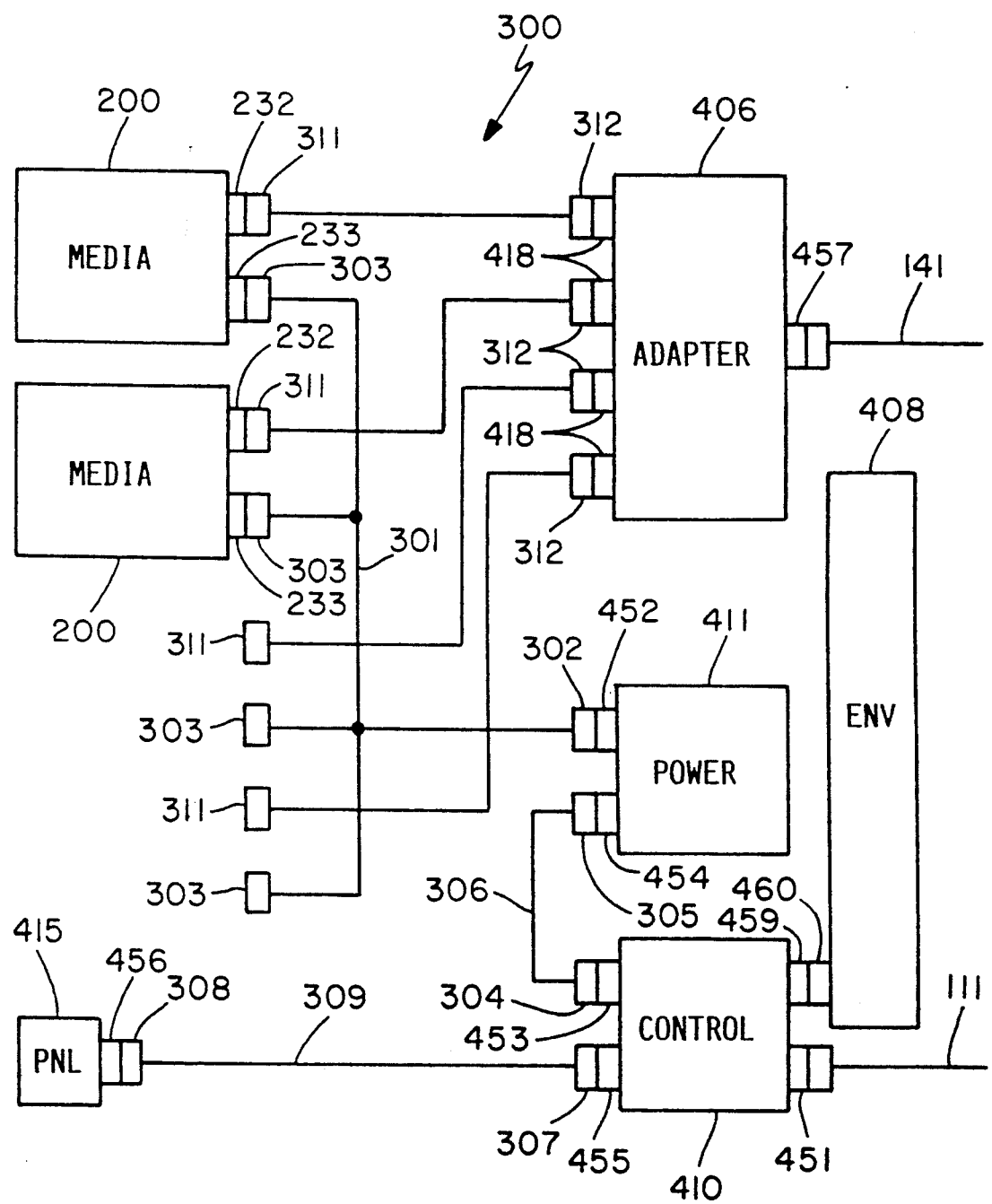
FIG. 3 is a schematic of the electrical interconnections within an enclosure according to the invention.

FIG. 3 is a schematic representation of the functional interconnection of the modules in enclosure 140 so as to couple all the modules into a self-contained, integrated subsystem of the entire data processing system—in this specific embodiment, a mass storage subsystem which can be inserted into and removed from the rack-mounted system as an integral unit. The interconnection is achieved by internal cabling 300. Raw power, 220Vac, connects to power control module 410 at a plug 451, and there the AC is switched to power converter module 411, which transforms it to a bulk voltage of 28 Vdc; converter 411 may have a relatively high power rating, preferably about 350 Watts. Control module 410 may also include circuits for functions such as line filtering, providing control power, diagnostics, and an operator panel interface. An edge connector 453 couples the AC to converter edge connector 454. Edge connector 452 connects the bulk DC to internal power cable 301 via mating plug 302. Sockets 303 then connect to plugs such as 233 to deliver the bulk voltage to drives 200, or to some other module in the enclosure. Multiple converters 411 may be coupled in parallel if desired. Other modules, such as a conventional battery backup supply (not shown), may also be included if desired; such a supply would be coupled to converter 411 for receiving a charging current and for supplying the 28 Vdc bulk voltage to cable 301 when the AC input 111 fails, or when converter 411 fails. Module 410 also connects to a control panel 415 via plugs 455 and 456, and sockets 307 and 308 on a cable 309. Front panel 415 includes conventional circuits for turning power on and off, and for monitoring the status of the power to the drives 200.

Adapter module 406 performs conventional collection and transformation of data signals from the individual drives 200 in enclosure 140. In this embodiment, drives 200 communicate data at plugs 232 according to the well-known Small Computer Standard Interface (SCSI) protocol, in a single-ended form. Sockets 311 and 312 and cable 313 deliver these signals to plugs 418 on adapter 406. The adapter multiplexes the signals into a single SCSI bus, and transforms them to differential form for more reliable transmission over cable 141. Cable 141 connects to the adapter by a plug 457. Adapter 406 could perform other conventional functions as well; for example, it could contain known circuits for converting one bus to another (e.g., a DFCI bus to multiple SCSI busses), or even an entire I/O processor for the data processing system. Moreover, multiple adapters, of the same or different type, can be accommodated within the enclosure. The adapter receives its power from converter 411 via cable 301, socket 310, and plug 458.

The power levels within enclosure 140 require forced cooling. A fan unit 408 is powered from module 410 via mating plugs 459 and 460. The fan turns on whenever 410 is powered up.

Figure 4:
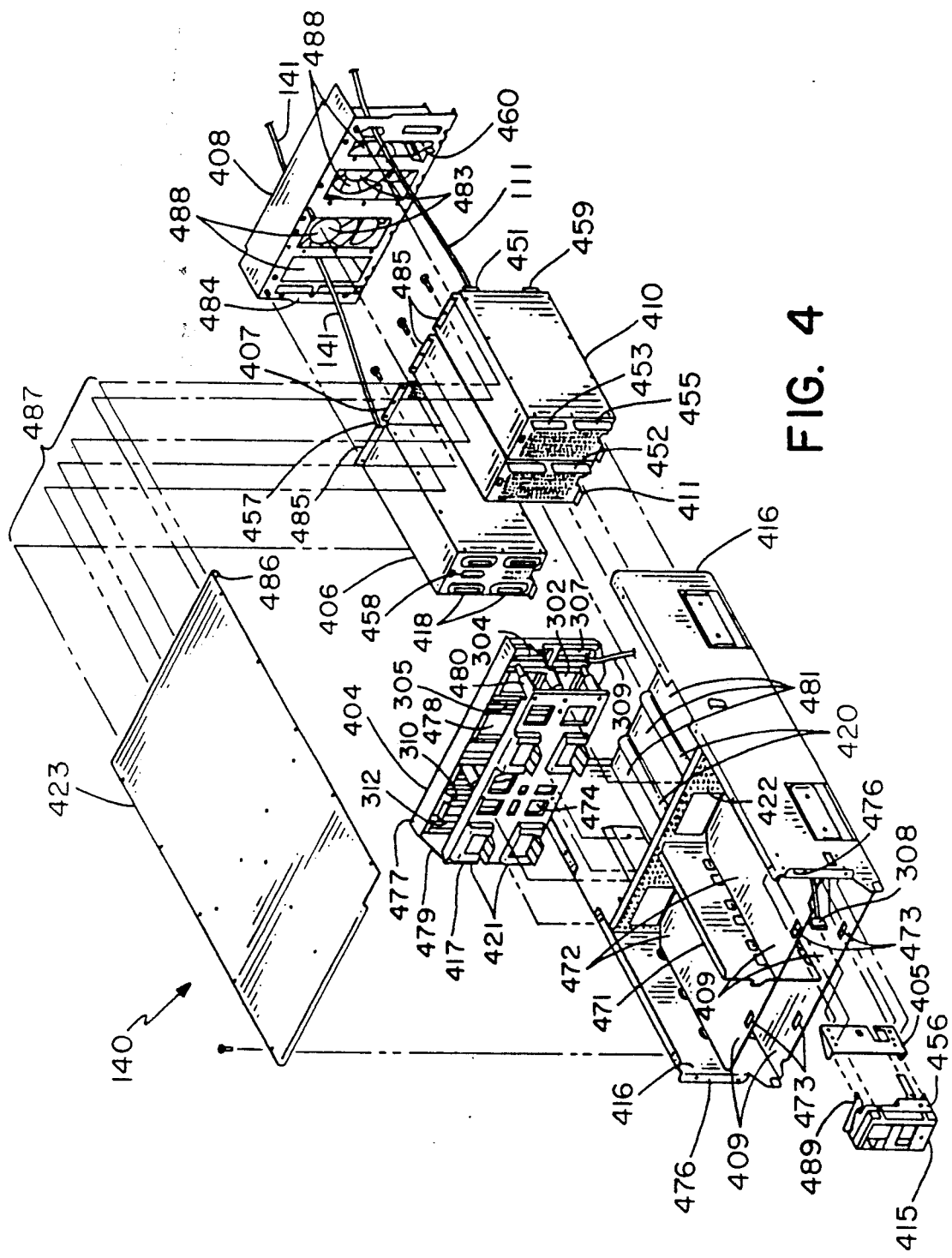
FIG. 4 is a perspective view of a first enclosure according to the invention.

FIG. 4 is an exploded perspective view of an enclosure 140 for holding up to four tray-mounted full-height 5.25-inch format media units, along with support units and a control panel, in a 19-inch standard EIA (Electronic Industry Association) rack for a data processing system. (3.5-inch standard media are designed to fit two devices in the same space as one 5.25-inch device, so the same enclosure 140 could hold eight of them.)

Member 416 forms two side walls and the bottom surface of enclosure 140, and plate 423 forms the top. Medial plates 471 and 472 define the height and width of the four front (media) bays 409. Slots 473 engage the locking tabs 221 on media units such as 200, FIG. 2, as they slide in horizontally from the front. Since the modules do not fill the entire volume of the bays, cooling air may flow through the bays from front to back, through the casing 210. Flanges 476 secure the front of the enclosure to conventional panel-mount strips (not shown) in the rack).

Figure 5:
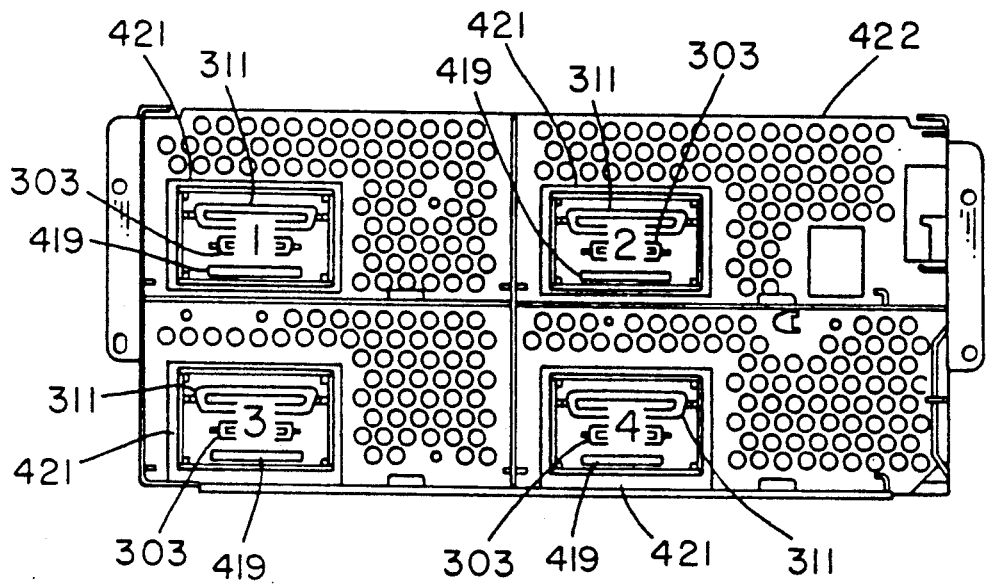
FIG. 5 is a front view looking into the front of the front bays of the enclosure of FIG. 4.

Interconnection or cable carrier 404 defines the rear wall of all four media bays 409. (In this embodiment, a foraminous shield 422 overlays it for electromagnetic compatibility (EMC) purposes.) Connector assemblies 421 mounted on the front face 417 of carrier 404 define the electrical connections to the media units residing in media bays 409. FIG. 5 shows these assemblies in greater detail. Data connector 311 and power connector 303 float within the assembly to provide greater tolerance in docking. Tongue 419 provides initial alignment. This multi-stage docking system is described in greater detail in the aforementioned Corfits patent. Devices other than those shown in FIG. 2 can be accommodated by replacing the specific assemblies 421 of FIG. 4 with other types. In fact, additional cutouts such as 474 can be provided so that the same physical part 417 may be used in a number of different configurations; extra cutouts are necessary in any event to provide air flow through enclosure 409, as will be described.

A rear face 477 of the carrier bears connector assemblies for the support modules in the rear of the enclosure. These connectors are the ones described as connectors 302, 304, 305, 310, and 312 in FIG. 3. Again, additional cutouts such as 478 can provide flexibility in accommodating different connectors with the same part, and also provide air flow. The front and rear carrier faces are held in the proper relative position by flange 479 and by a number of standoffs 480. The wiring 300 shown in FIG. 3 runs between the front and rear carrier faces.

Cable 309 runs from connector 307 on the rear face, forward along a side wall to connectors 309 and 456, the latter on operator panel 415. Bracket 405 mounts panel 415 along one side of the enclosure. Arms 489 mate with this bracket to allow panel 415 to swing outward to the right. This hinge action provides a panel which does not decrease the enclosure width available for media bays, yet allows the media devices to be inserted and removed easily, without even removing the enclosure from the rack.

Four rear (support) bays 481 are defined by rails 420 Support modules such as 406, 410, and 411 slide horizontally into the bays until they engage their respective connectors on rear carrier face 477. Cooling air flows through these modules by means of perforations in their end walls. Air flow through any empty slots is regulated by a cover plate such as 407.

As described previously, the support modules may provide any number and combination of support functions for the media modules in the front media bays 409: a control module 410, one or more bulk supplies 411, one or more data adapters or converters 406, and so on. In this embodiment, all support modules have the same standard width. It is entirely feasible, however, to include modules having integer multiples—or even fractions—of the standard width. It is also possible to eliminate rails 420 and to allow modules of any width whatsoever in the rear bays 481. The height and length of the support modules fit the height and depth of the rear bays.

An environmental module 408 provides cooling air and also a rear wall for enclosure 140. Two impellers 483 pull air horizontally from media bays 409 through carrier 404 and support modules 406, 410 and 411, exhausting into the rear of the rack 100. Module 408 extends the full width of enclosure 140. Its vertical face 484 receives removable bolts from the rear, extending through flanges 485 on the support modules and cover plates, and thence through flange 486 on top plate 423, or through rails 420, as shown by dashed lines 487. This locks all the support-bay components together securely, yet allows easy disassembly from the rear of the enclosure 140, without even removing the enclosure from its rack. Cutouts 488 in the environmental module behind each support bay provide two functions: air flow and access to connectors such as 457, FIG. 3, on the rear of the data modules to connect to a data cable such as 141.

Figure 6:
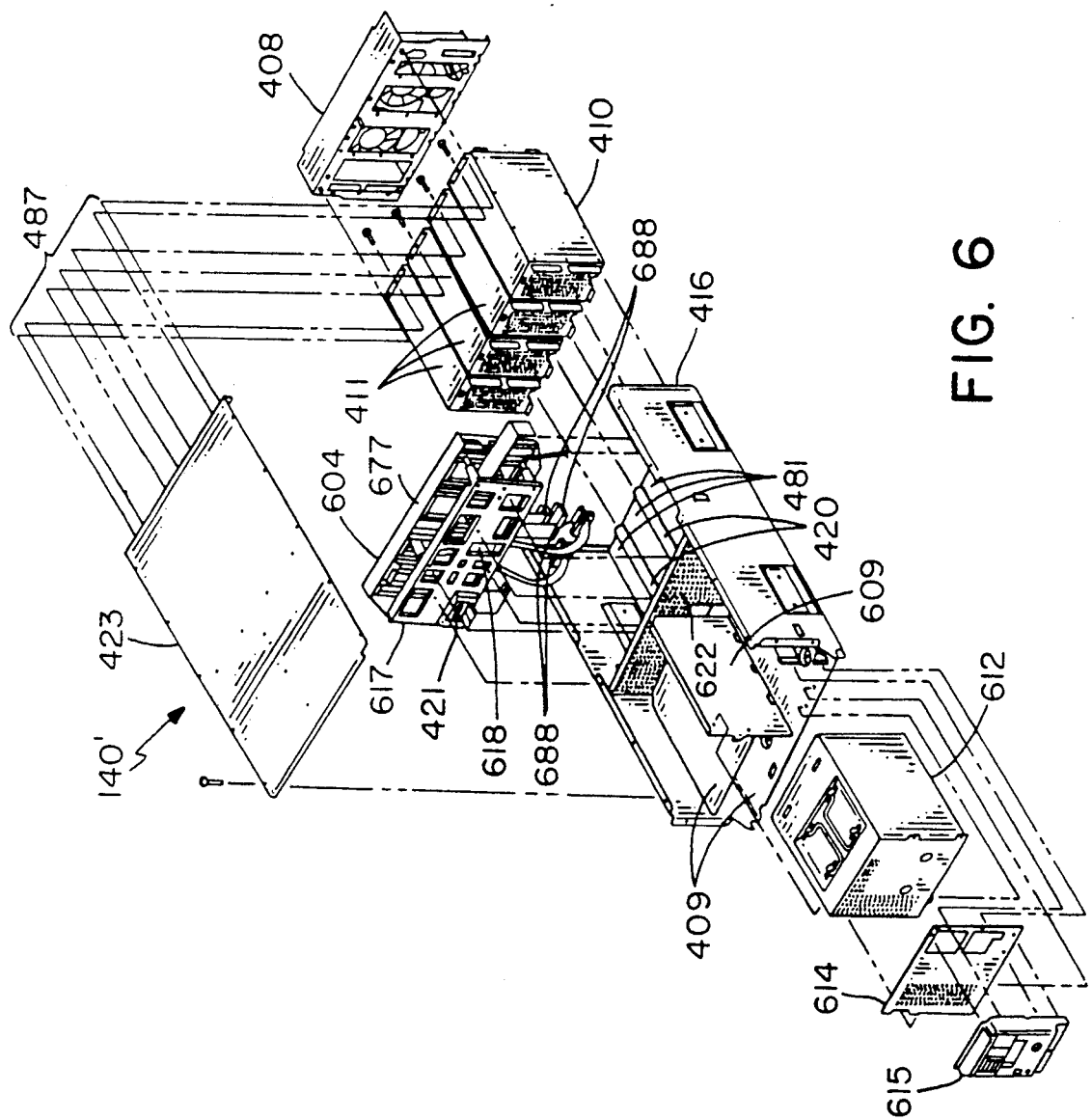
FIG. 6 is a perspective view of a further enclosure.

FIG. 6 shows another embodiment of an enclosure 140'. This version has two small front bays 409 and a bay 609 at the right side which is exactly twice the size of either bay 409. Enclosure 140' is configured to sit just above CEC 120 in rack 100, FIG. 1, and to make all electrical connections to it directly, via a vertical central carrier, connecting to a CEC backplane such as that of the aforementioned applications to Aug and Casanova.

Figure 7:
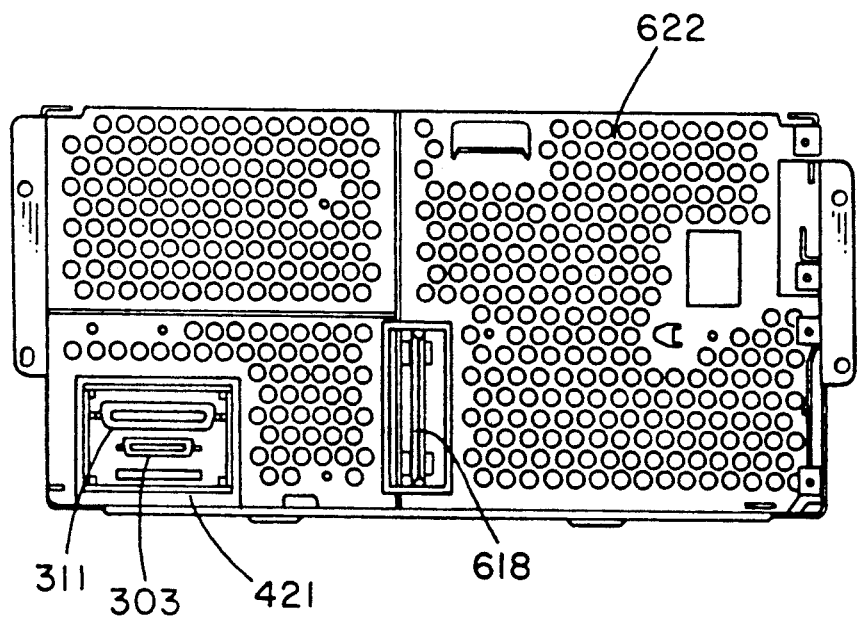
FIG. 7 is a front view looking into the front of the front bays of the enclosure of FIG. 6.

Large bay 609 receives a high-capacity battery backup subsystem 612 having an operator panel 615 mounted directly thereto, through an EMC shield 614. As also shown in FIG. 7, module 612 plugs into a compliant connector 618 mounted on carrier 604. EMC shield 622 provides radiation reduction while allowing the flow of cooling air. The upper small bay 409 has no connector; in the configuration of FIG. 6, there is not sufficient cooling capacity to allow two media devices in the enclosure.

Central carrier 604 is very much like carrier 404, FIG. 4. Front face 617 carries connectors 418 and 604. Rear face 677 bears connectors for four support modules. Connections to the CEC enclosure are by means of cables 688, which emerge from the bottom of carrier 604, and pass through an aperture (not shown) in the bottom wall of enclosure 140'.

The specific support modules shown in FIG. 6 are a power-control module 410 and three bulk power supplies 411. These fill up all available support bays 481. Fan module 408 attaches to frame 416, and locks modules 410 and 411, in the same manner as described for FIG. 4. Electrical connection to fan unit 408 and to power cable 111 is via the rear of module 410, as before.

We claim as our invention:

1. An enclosure for mounting multiple electronic modules of a first type and a second type together in a rack, wherein said modules of the first type have electrical connection means on one end wall thereof, and said modules of the second type have electrical connections on both end walls thereof, said enclosure extending horizontally the full width of said rack and adapted to be mounted above and below other enclosures in said rack and electrically interconnected thereto by inter-enclosure cables, said enclosure comprising:

at least one sheet member forming side and bottom walls of a box conforming to the width of said rack, said box having front and rear regions;

a plurality of bay members mounted to said side and bottom walls in said front region for dividing said front region into a plurality of front bays adapted to receive at least said modules of the first type by horizontal motion from the front of said enclosure into said front bays;

an interconnection carrier extending the width of said enclosure between said side walls, said carrier having front and rear faces, said front face bearing a first plurality of electrical connectors for receiving the electrical connection means of said modules of the first type as said modules slide horizontally into said front bays, said rear face bearing a second plurality of electrical connectors for receiving the electrical connections means of a first end wall of said modules of the second type as said modules slide horizontally into said rear region of said enclosure, said carrier further including electrical wiring interconnecting said electrical connectors of said first and second pluralities;

an environmental module attached to said sheet member in said enclosure and mounted behind said rear region and enclosing it, said environmental module including powered cooling means for moving air horizontally through said front bays, said interconnection carrier, and said rear region, said environmental module being further provided with means for allowing the coupling of the electrical connections of a second end wall of said modules of the second type to inter-enclosure cables.

2. An enclosure according to claim 1, further including means disposed in each of said front bays for locking one of said modules of the first type positively in place.

3. An enclosure according to claim 1, further including means for locking both said modules of the second type and said environmental module positively in place.

4. An enclosure according to claim 1, further including a top member fastened to said side walls.

5. An enclosure according to claim 4, further including means for removably fastening said modules of the second type to said top member.

6. An enclosure according to claim 1, wherein said interconnection carrier include apertures in both faces thereof so as to allow air to flow through said carrier in response to said cooling means.

7. An enclosure according to claim 1, wherein said front bays are adapted to allow air to flow from the front of said enclosure to said interconnection carrier in response to said cooing means.

8. An enclosure according to claim 4, further including a control panel mounted at least partially in front of said front bays, and electrical wiring connecting said panel with said wiring in said interconnection carrier.

9. An enclosure according to claim 1, wherein modules of a first type are mounted in said enclosure, said modules of the first type comprising functional modules for a data processing system, and wherein modules of a second type are mounted in said enclosure, said modules of the second type comprising support modules for said functional modules, said modules of the first type and said modules of the second type together forming an integrated subsystem of said data processing system.

10. An enclosure of according to claim 9, wherein said modules of the first type are media modules for the mass storage of data in said data processing system.

11. An enclosure of according to claim 9, wherein at least some of said modules of the second type provide power for said modules of the first type.

12. An enclosure of according to claim 9, wherein at least some of said modules of the second type provide a data interface between said modules of the first type and the remainder of said data processing system.

13. An enclosure for mounting multiple first and second electronic modules together in a rack, wherein said first modules have form factors in a first set and said second modules have form factors in a second set different for said first set, each of said first and second modules having electrical connection means on at least one end wall thereof, said enclosure extending horizontally the full width of said rack and adapted to be mounted above and below other enclosures in said rack and electrically interconnected thereto by inter-enclosure cables, said enclosure comprising:
   at least one sheet member forming side and bottom walls of a box conforming to the width of said rack, said box having front and rear regions;
   a plurality of bay members mounted to said side and bottom walls in said front region for dividing said front region into a plurality of front bays adapted to receive said first modules having said first set of form factors by horizontal motion from the front of said enclosure into said front bays;
   a plurality of rear bay members disposed in said rear region for dividing said rear region into a plurality of rear bays adapted to receive said second modules having said different set of form factors by horizontal motion form the rear of said enclosure into said rear bays;
   an interconnection carrier extending the width of said enclosure between said side walls, said carrier having front and rear faces, said front face bearing a first plurality of electrical connectors for receiving the electrical connection means of said first modules as said first modules slide horizontally into said front bays, said rear face bearing a second plurality of electrical connectors for receiving the electrical connection means of said second modules as said second modules slide horizontally into said rear bays of said enclosure, said carrier further including electrical wiring interconnecting said electrical connectors of said first and second pluralities;
   an environmental module extending the width of said enclosure and mounted behind said rear bays so as to hold said second modules in place, said environmental module including powered cooling means for moving air horizontally through said front bays, said interconnection carrier, and said rear region.

14. An enclosure according to claim 13, wherein said interconnection means includes further electrical wiring connected to said electrical connectors and extending outside said interconnection carrier, said further wiring additionally including electrical connectors for connection to at least one of said other enclosures in said rack.

15. An enclosure according to claim 13, wherein different ones of said front bays have different sizes, so as to accommodate first modules of a plurality of different form factors.

16. An enclosure according to claim 15, wherein all of said sizes are integer multiples of one of said sizes.

17. An apparatus for mounting multiple electronic modules of a first type and a second type together in a rack, said apparatus extending horizontally the full width of said rack and adapted to be mounted above and below other similar apparatus in said rack and electrically interconnected thereto by intra-rack cables coupled to said modules of the second type, said apparatus comprising:
   a frame member forming the outlines of a substantially rectangular parallelepiped conforming to the interior width of said rack;
   an interconnection carrier attached to said frame member, extending the width of said rectangular parallelepiped and dividing said parallelepiped into front and rear regions, said interconnection carrier having a front face facing said front region and a rear face facing said rear region, said front face bearing a first plurality of electrical connectors for receiving the electronic modules of said first type, and said rear face bearing a second plurality of electrical connectors for receiving the electronic modules of said second type, said carrier further including electrical wiring interconnecting said electrical connectors of said first and second pluralities;
   one or more bay members attached to said frame member for dividing said front region into a plurality of front bays, each said bay extending from the front of said rectangular parallelepiped to the front face of said interconnection carrier, and adapted to receive said first type of the electronic module by horizontal sliding motion from the front of said apparatus into said front bay;
   wherein said first plurality of electrical connectors comprise means for mating with electrical connection means of the electronic module of said first type as said electronic module is inserted into said bay by horizontal sliding motion;
   wherein said second plurality of electrical connectors comprise means for mating with electrical connection means of the electronic module of said second type as said electronic module is inserted into said rear region of said apparatus by horizontal sliding motion;
   an environmental module attached to said frame member, mounted behind said rear region and extending the width of said parallelepiped, said environmental module including powered cooling means for moving air horizontally through said front bays, said interconnection carrier, and said rear region.

18. The apparatus for mounting multiple electronic modules of claim 17, wherein modules of a first type have substantially identical form factor.

19. The apparatus for mounting multiple electronic modules of claim 17, wherein modules of a first type are mounted in said enclosure, said modules of the first type comprising functional modules for a data processing system, and wherein modules of a second type are mounted in said enclosure, said modules of the second type comprising support modules for said functional modules, said modules of the first type and said modules of the second type together forming an integrated subsystem of said data processing system.

20. The apparatus for mounting multiple electronic modules of claim 19, wherein said modules of the first type are media modules for the mass storage of data in said data processing system.

21. The apparatus for mounting multiple electronic modules of claim 19, wherein at least one of said modules of the second type provides power for said modules of the first type.

* * * * *

UNITED STATES PATENT AND TRADEMARK OFFICE
CERTIFICATE OF CORRECTION

PATENT NO. : 5,193,050
DATED : March 9, 1993
INVENTOR(S) : Roger F. Dimmick et al It is certified that error appears in the above-identified patent and that said Letters Patent is hereby corrected as shown below:

On the title page: Item [56]

Add -- Related U.S. Application Data

Continuation of Serial No. 07/547,654, July 3, 1990, abandoned. --

Signed and Sealed this

Thirty-first Day of January, 1995

Attest:

BRUCE LEHMAN

*Attesting Officer*  *Commissioner of Patents and Trademarks*